Patented Jan. 16, 1945

2,367,376

UNITED STATES PATENT OFFICE 2,367,376

COATING COMPOSITION

Laurence L. Rector, Fort Worth, and Charles L. Cron, Houston, Tex.

No Drawing. Application July 24, 1941,
Serial No. 403,868

5 Claims. (Cl. 106—171)

This invention relates to new and useful improvements in coating compositions.

This application is a continuation-in-part of our co-pending application, Serial No. 296,446, filed September 25, 1939.

In the production and refining of petroleum there are many instances where it is necessary to store the petroleum or its fractions. This storage is usually in metallic tanks and a serious corrosion problem is thereby encountered. Nearly all crude oil contains dilute acids, salt water, and other materials which corrode iron and steel rapidly. Even wood is not entirely immune to the attack of these corrosive substances. There are also many other instances in this and various other industries where it is desirable to protect tanks and pipe lines against corrosion.

A problem that occurs in almost as many instances as corrosion, is the deposition of paraffin from petroleum onto the walls of tubing and tanks. Tanks must be frequently cleaned out to remove the paraffin from the walls thereof. Similarly, tubing and pipe lines must be scraped or reamed to remove paraffin deposits from the inside thereof.

One object of the invention is to provide coating compositions suitable for coating the inside of storage tanks, which will effectively seal the inside of said tanks, and prevent the same from leaking and causing material stored therein to be lost or wasted.

Another object of the invention is to provide an improved coating composition which is suitable for coating the inside of storage tanks, and which in its initial state before application possesses sufficient fluidity as to allow its easy application.

A further object of the invention is to provide an improved coating composition which, after application and upon standing, dries and hardens to a pliable, elastic mass, whereby it never reaches a hard brittle state but retains sufficient plasticity as to allow it to expand and contract with the tank, thereby eliminating cracking and chipping of said composition.

An important object of the invention is to provide an improved coating composition which is waterproof and is also unaffected by petroleum, or any of its fractions, and which will protect the inside of tanks, tubing and pipe lines against the corrosive action of salt water, dilute acids, and other corrosives occurring in crude oil.

Another important object of the invention is to provide an improved coating composition which when placed on a surface will prevent the deposition of paraffin from petroleum upon said surface, whereby storage tanks, pipe lines, well tubing, sucker rods, and similar equipment may be coated by said composition and kept clean from all paraffin deposits, thereby materially aiding in the operation of said equipment, and allowing the tanks to empty clean.

A further object of the invention is to provide an improved coating composition which will protect the inside of water tanks against corrosion, and may be used in a variety of other instances to protect tanks and pipes against corrosion.

Another object of the invention is to provide a composition of the character described, which includes a base solution consisting of a cellulose derivative dissolved in a group of liquid solvents, such as esters and ketones, the solvents having boiling points which vary from low to high over a given range, whereby when evaporation occurs, the rate of evaporation is uniform and gradual, with the result that the composition changes from its original free flowing consistency to a plastic mass which will not flow of its own accord or under considerable pressure, and the solution will not become dry or brittle because of evaporation, as would be the case if only one solvent of a low boiling point was employed.

A still further object of the invention is to provide an improved coating composition wherein the base solution has a softener or plasticizer admixed therewith in excessive amounts; that is, the amount of plasticizer exceeds the retentivity point of the final state of the composition, whereby upon standing or aging, the excess plasticizer will slowly exude from the composition to provide a protective film of lubricant on the surface of said composition, said film of lubricant being desirable to maintain the plasticity of the composition.

In producing the improved composition, any derivative of cellulose, such as a salt (cellulose nitrate), an organic ester (cellulose acetate) or an ether (ethyl cellulose or benzyl cellulose) is employed. For the purpose of this description, cellulose nitrate, which is also known as nitrocellulose, will be used, but it is to be understood that any derivative of cellulose may be substituted therefor.

The cellulose nitrate is dissolved in a liquid solvent or group of solvents, the dissolution being affected during thorough agitation or mixing. The liquid solvents may be esters and ketones, which vary in boiling points over a relatively wide range, as for example, from 80 degrees F. to 300 degrees F. As explained, the cellulose nitrate is dissolved in this group of solvents to form a base solution, and the proportion of the cellulose derivative to the solvents is such that said solution has body but is quite mobile, being capable of flowing. It has been found that a base solution containing about twelve per cent of the cellulose derivative has a suitable consistency, but the invention is not to be limited to this figure, as the proportions may vary without defeating the purpose of the invention.

The base solution so formed is made up of a cellulose derivative in solution in a series of solvents. This series of solvents ranges in boiling points from a fairly low temperature, 50 to 100 degrees F., to a fairly high temperature, 200 to 400 degrees F. These temperature ranges are stated merely to give an idea of the range and may be varied at will. The composition is originally made up with these various solvents and may be prepared with any desirable consistency, since the lighter solvents may be added in any suitable ratio so as to give the desired initial fluidity. The composition may be sprayed on the inside of a tank with a spray gun or may be put on with a brush.

As the composition stands on the inside walls of the tank, the lighter solvents, or solvents having the lower boiling points, will evaporate; while the heavier, or higher boiling point, solvents will not evaporate even under considerable heat, and they maintain the composition in an elastic condition. It will be seen that the final or terminal consistency of the composition may be determined beforehand by varying the proportions of the lighter and the heavier solvents. Also, it is obvious that the composition will not become caked or brittle but will be held in an elastic condition indefinitely by the action of the high boiling solvents. The elasticity of the compound is not sufficient as to allow it to flow of its own accord or under pressure, but it is sufficient as to prevent the compound from caking or chipping under conditions of vibration. The higher boiling solvents used are essentially nonsoluble in petroleum or its fractions, whereby the compound may not be dissolved or disintegrated by said petroleum, and is ideal for use in tanks to be used for the storage of petroleum and its fractions. It is pointed out that the compound and its ingredients are also insoluble in water, whereby the composition may be used to protect water lines and tanks, and steam lines.

Resin is then added to the base solution to add body and adhesiveness to the composition. The resin added is preferably one which is insoluble in petroleum; shellac, for example, could be used. The addition of the resin has very little effect on the viscosity of the composition and serves to add film-forming material to the composition, whereby the tank or pipe line coated with the composition is more completely protected. Resin may be added in quantities equal in weight up to 100 per cent of the weight of the cellulose.

The base solution, consisting of the cellulose nitrate and the group of solvents plus the resin, is next admixed with a plasticizer or softener, the latter being preferably added to the solution while stirring. The plasticizer or softener is one of very low solubility in petroleum hydrocarbons, and one which is non-drying. It has been found that a blown vegetable oil, and particularly blown castor oil, is suitable. Blown castor oil is non-drying, tends to thicken the composition and increase the viscosity thereof, and gives the composition in its final state a stickiness which causes it to adhere closely to the tank walls. Blown castor oil also has the desirable qualities of being compatible with cellulose nitrate and having a low solubility in petroleum hydrocarbons. If added suddenly to the base solution, castor oil might result in curdling or precipitating the cellulose nitrate and, therefore, to avoid this it is desirable that the castor oil be added slowly and with stirring. It is pointed out that the invention is not to be limited to blown castor oil, and that any polymerized or oxidized oil may be used, provided it is insoluble in petroleum and its fractions. Any softener or plasticizer having characteristics similar to those of blown castor oil may be employed. Whatever plasticizer is used, is always added in such amounts as to exceed the retentivity point of the particular cellulose derivative for that softener.

The oil or softener is added to the base solution preferably in an amount equal in weight to three to five times the weight of the cellulose derivitive, although these proportions may vary. While the exact amount of softener or plasticizer which is added to the base solution is subject to variation, it is desirable that sufficient softener or plasticizer be added so as to exceed the point of retentivity of the cellulose nitrate. Thus, when the mixture is allowed to stand, the softener or plasticizer slowly exudes from the mixture. This exuding plasticizer, which is the blown vegetable oil, forms a thin protective film on the outer surface of the compound, as will be more fully explained. The excess plasticizer is carried in the composition in minute particles much as the oil is carried in a stable oil-water emulsion. This suspension is very stable and the plasticizer does not commence to exude or "sweat out" of the composition until the composition has lost a part of its solvents by evaporation and has hardened to its final state. The addition of the blown vegetable oil functions in the compound to prevent drying beyond a given or predetermined point and adds body to the composition.

After the base solution and softener or plasticizer (castor oil) are admixed, a suitable bulking agent, such as a mineral filler, is added. The filler is inert, insoluble in water, petroleum, salt water, and dilute acids. The filler is preferably added in amounts sufficient to give the composition in its final or hardened state the desired consistency. It has been found that such consistency is obtained by adding the filler in amounts equal to from fifteen to twenty-five per cent of the total weight of the liquid, depending upon the density of the filler used. Although any suitable mineral filler may be employed, a filler or pigment such as "asbestine," clay, graphite, talc, or the like, may be employed, and it is preferable that the filler be finely ground so as to give the mixture a smooth texture. The filler or pigment is added to the composition for the purpose of making said composition opaque. This is necessary because the person applying the coating must be able to ascertain which portions of the surface have been coated and which have not. If the composition were left in a clear condition, this would be impossible. A mineral filler has been found entirely satisfactory, but other equivalent fillers, capable of the same function in the composition, could be used.

The low-boiling solvents used in making up the base solution are added in sufficient amounts as to carry the filler and maintain the composition in a fluid state, whereby it may be sprayed. As hereinbefore set forth, the lighter solvents evaporate from the composition as it hardens. Therefore, any desired amount of light solvents may be used without departing from the principle taught by the invention.

In order to prevent the mineral from settling in the liquid during storage, a suitable suspending agent, such as aluminum stearate, magnesium linolenate, or the like, may be added although this is not essential.

In use, the composition is applied to the inside surface of a tank, tubing, or any other surface which it is desired to protect. Although this application may be by means of a spray gun or by a brush, it has been found that the spray gun method is the most satisfactory. The composition is sufficiently fluid to allow this application, and may be made even more fluid by the addition of more light solvent or thinner. As the composition sets, the lighter solvents evaporate therefrom, thus allowing the composition to attain a soft pliable consistency, which is not mobile, and will not allow the composition to flow of its own accord or under considerable pressure. The presence of the plasticizer or softener and the high boiling solvents in the composition prevents the composition from drying or hardening beyond a certain point. Thus the composition maintains a plastic state which allows it to stretch and bend without cracking or chipping. The composition forms a smooth film over the surface to be protected, preventing the corrosion thereof, and protecting the same against paraffin deposits.

As has been previously pointed out, the softener or plasticizer (blown castor oil) is admixed with the base solution in an amount which is in excess of the retentivity point of the cellulose nitrate. When the composition is applied to the surface and allowed to stand, the excess of the plasticizer slowly exudes from the compound, and such exudation forms a thin film of said plasticizer, in this instance, blown castor oil, on the surface of the composition. This film or coating of blown castor oil serves to give additional protection to the tank and maintains the plasticity of the composition after it has set.

A specific example of the portions of the ingredients used in the composition is given as follows:

| | Parts |
|---|---|
| Cellulose nitrate | 40 |
| Acetone | 132 |
| Ethyl acetate | 441 |
| Benzol | 144.8 |
| Glycerol triacetate | 5 |
| Blown castor oil | 200 |
| Pigment | 25 |

Which example after setting would have approximately the following composition:

| | Parts |
|---|---|
| Cellulose nitrate | 40 |
| Blown castor oil | 200 |
| Pigment | 25 |

Another example of the proportions of the ingredients used in the composition is given as follows:

| | Parts |
|---|---|
| Cellulose nitrate | 40 |
| Ethyl acetate | 90 |
| Butyl acetate | 45 |
| Amyl acetate | 90 |
| Ethyl alcohol | 90 |
| Butyl alcohol | 90 |
| Benzol | 65 |
| Toluol | 160 |
| Xylol | 90 |
| Blown castor oil | 200 |
| Pigment | 30 |

This example, after hardening or setting, would have approximately the following composition:

| | Parts |
|---|---|
| Cellulose nitrate | 40 |
| Blown castor oil | 200 |
| Pigment | 30 | and possibly a trace of amyl acetate.

The composition has been found particularly adaptable for use in the petroleum industry, as it is substantially unaffected by dilute acids, gas, gasoline, or other petroleum hydrocarbons; it is also waterproof and is capable of withstanding high pressure, as well as high temperatures. Although it has been used satisfactorily in the petroleum industry for protecting metal tanks and other surfaces that come in contact with crude oil and its fractions, it may be used elsewhere. The constituents in the composition are insoluble in water, as well as insoluble in petroleum, as above explained, and thereby form an effective coating composition for water tanks and steam lines.

Another very important function of the coating composition is its prevention of paraffin formation. Tanks, tubing, pipe lines, sucker rods, and similar equipment may be coated with this composition, whereby the formation of paraffin deposits thereon will be substantially eliminated. Thus, the composition carries out two very important functions. It protects a surface against corrosion and prevents the deposition of paraffin thereon.

In conjunction with coating by this composition, it has been found that the coating tends to present a smooth surface to the interior of the tubing or pipe coated, and thereby reduces friction losses in said pipe when liquid is being pumped therethrough.

Various changes and modifications may be made in the proportions and nature of the herein described ingredients within the scope of the appended claims.

We claim:

1. A coating composition including, a base solution comprising a cellulose derivative selected from the group consisting of cellulose nitrate, cellulose acetate, ethyl cellulose and benzyl cellulose dissolved in a series of liquid solvents, a portion of which solvents will evaporate as the composition sets, blown castor oil admixed with the base solution in such high proportions as to exceed the retentivity of the set composition, whereby as the composition hardens after application the excess blown castor oil will exude from the composition and said composition will remain in a moist plastic state, the blown castor oil being compatible with the base solution in all proportions and compatible in limited proportions only with the cellulose derivative.

2. A coating composition including, 3% to 5% cellulose nitrate, 13% to 15% acetone, 40% to 50% ethyl acetate, 10% to 20% benzol, at least .25% glycerol triacetate, and 15% to 25% blown castor oil.

3. A coating composition including, 3% to 5% cellulose nitrate, 13% to 15% acetone, 40% to 50% ethyl acetate, 10% to 20% benzol, at least .25% glycerol triacetate, 2% to 3% pigment, and 15% to 25% blown castor oil.

4. A coating composition including, a cellulose derivative selected from the group consisting of cellulose nitrate, cellulose acetate, ethyl cellulose and benzol cellulose in the amount of 3–5%, 13% to 15% acetone, 40% to 50% ethyl acetate, 10% to 20% benzol, at least .25% glycerol triacetate, and 15% to 25% blown castor oil.

5. A coating composition including, a base solution comprising a cellulose derivative selected from the group consisting of cellulose nitrate, cellulose acetate, ethyl cellulose and benzyl cellulose dissolved in a series of liquid solvents, a portion of which solvents will evaporate as the composition sets, blown non-drying vegetable oil admixed with the base solution in such high proportions as to exceed the retentivity of the set composition, whereby as the composition hardens after application the excess blown non-drying vegetable oil will exude from the composition and said composition will remain in a moist plastic state, the blown non-drying vegetable oil being compatible with the base solution in all proportions and compatible in limited proportions only with the cellulose derivative.

LAURENCE L. RECTOR.
CHARLES L. CRON.